UNITED STATES PATENT OFFICE.

ALBRECHT THIELE, OF BERLIN, GERMANY, ASSIGNOR TO CHEMISCHE FABRIK AUF ACTIEN, (VORM. E. SCHERING,) OF BERLIN, GERMANY.

SULFO COMPOUNDS OF QUINOLIN-4-CARBOXYLIC ACIDS ARYLATED IN THE 2 POSITION.

1,091,870.     Specification of Letters Patent.     Patented Mar. 31, 1914.

No Drawing.     Application filed October 7, 1913. Serial No. 793,829.

*To all whom it may concern:*

Be it known that I, ALBRECHT THIELE, doctor of philosophy, chemist, citizen of the German Empire, residing at Berlin, Kingdom of Prussia, German Empire, have invented a new and useful Improvement in Sulfo Compounds of Quinolin-4-Carboxylic Acids Arylated in the 2 Position, of which the following is a specification.

The subject matter of my invention is the hitherto unknown sulfo compounds of quinolin-4-carboxylic acids arylated in the 2 position.

The new products have proved to be valuable analgetics. They have an acidulous taste and are insoluble in water and organic solvents at ordinary temperature, more or less soluble in hot water, soluble in solutions of alkalis and alkaline earths and forming salts.

The following examples are methods of manufacture, the parts being by weight:

(1) 300 parts of 2-phenylquinolin-4-carboxylic acid are heated on an oil bath together with 1600 parts of concentrated sulfuric acid and another 400 parts of sulfuric acid which contains 7 per cent. of anhydrid for from 6 to 7 hours at a temperature between 175 and 190° C. After cooling, the fluid is poured into 10000 parts of water and after twenty four hours standing the liquor is sucked off from the crystalline mass. The sulfo compound when recrystallized out of 40 per cent. alcohol does not melt at 250° C. but is soluble in hot water, alkali, hot dilute mineral acids and is insoluble in organic solvents.

(2) 300 parts of 6-methyl-2-phenylquinolin-4-carboxylic acid are heated upon an oil bath to 180–190° C. with the same quantities of sulfuric acid and for the same period as in example (1), the further treatment also taking place as in that example. The compound obtained crystallizes out of 35 per cent. alcohol, the relations of melting and solubility being similar to those previously described.

(3) 250 parts of 2-phenylquinolin-4-carboxylic acid are subjected for about two days to the vapor of sulfuric acid anhydrid at a temperature of from 40–45° C. The mass which now weighs about another 300 parts is added to ice water and mixed with an excess of carbonate of lime. The calcium salt of the sulfo-2-phenylquinolin-4-carboxylic acid is easily soluble and is easily separated from the insoluble calcium salt of 2-phenylquinolin-4-carboxylic acid. The first named compound is transformed into the sodium salt by the addition of sodium carbonate from which after concentration of the solution the free acid can be obtained by the addition of the necessary amount of an acid such as hydrochloric acid.

Other derivatives can be sulfonated in similar manner.

The sulfo compound of 2-phenylquinolin-4-carboxylic acid has the structural formula:

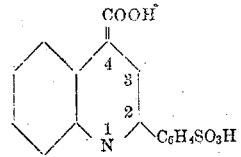

I claim as my invention:

1. As new products the sulfo compounds of quinolin-4-carboxylic acids arylated in the 2-position, such compounds having an acidulous taste, being insoluble in water and organic solvents at ordinary temperature, more or less soluble in hot water, forming salts, and having analgetic properties, substantially as described.

2. As a new product the sulfo compound of 2-phenylquinolin-4-carboxylic acid, having the formula

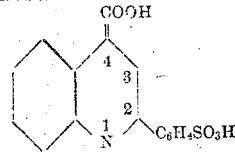

being insoluble in water and organic solvents at ordinary temperature, soluble in hot dilute mineral acids as well as in alkalis and earth alkalis, and having analgetic properties substantially as described.

In testimony whereof I have hereunto set my hand in the presence of two subscribing witnesses.

DR. ALBRECHT THIELE.

Witnesses:
   WOLDEMAR HAUPT,
   HENRY HASPER.